UNITED STATES PATENT OFFICE.

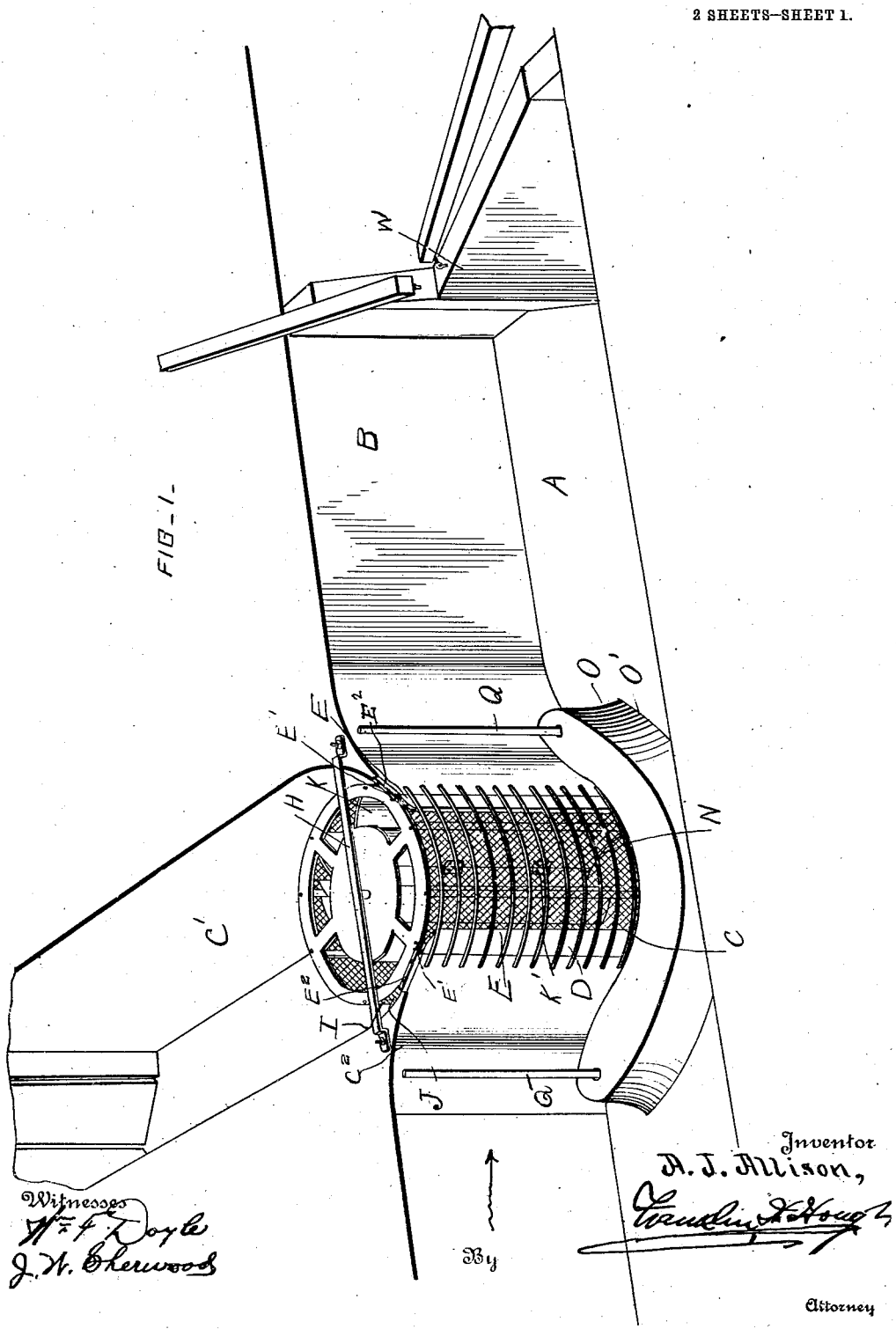

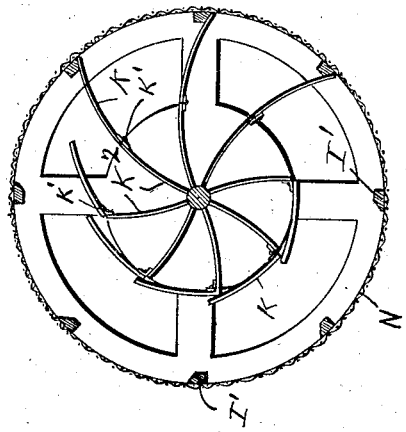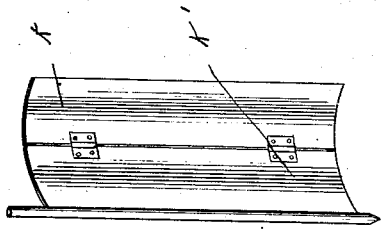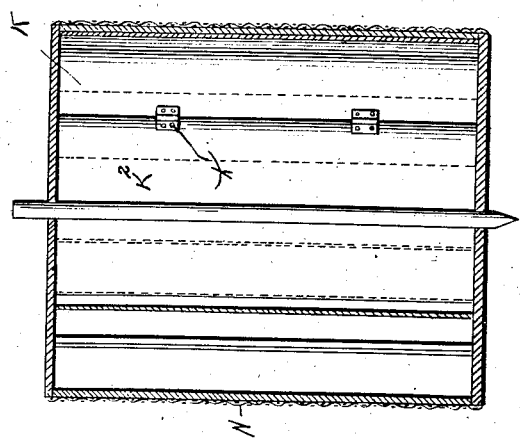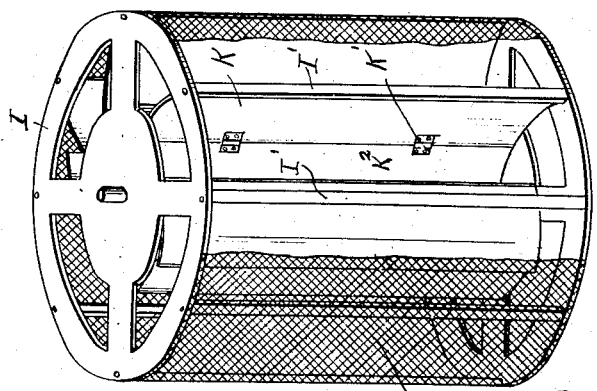

ANDREW J. ALLISON, OF HARTSHORNE, OKLAHOMA.

DEVICE FOR PREVENTING FISH AND DRIFT FROM GOING DOWN WATERWAYS.

1,109,385.  Specification of Letters Patent.  Patented Sept. 1, 1914.

Application filed October 30, 1913. Serial No. 798,323.

*To all whom it may concern:*

Be it known that I, ANDREW J. ALLISON, a citizen of the United States, residing at Hartshorne, in the county of Pittsburg and State of Oklahoma, have invented certain new and useful Improvements in Devices for Preventing Fish and Drift from Going Down Waterways; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for preventing fish and drift from passing down irrigating waterways from streams.

The invention comprises essentially an apparatus of this nature so constructed as to be automatic in its action, being operated by the flow of water and without an attendant, means being provided consisting of a float whereby trash upon the surface of the water may be deflected away from the passageway leading into the irrigating waterway.

The invention comprises various details of construction and combinations and arrangements of parts which will be hereinafter fully described, shown in the accompanying drawings and then specifically defined in the appended claims.

I illustrate my invention in the accompanying drawings, in which:—

Figure 1 is a perspective view showing the installation of my apparatus. Fig. 2 is a perspective view of the power wheel, part of the screening about the same being cut away to better illustrate the invention. Fig. 3 is a sectional view centrally and vertically through the wheel. Fig. 4 is a cross sectional view through the wheel, and Fig. 5 is a detail perspective view of one of the hinged propelling wings of the wheel.

Reference now being had to the details of the drawings by letter, A designates the bed of a stream and B one of the banks which has an opening C therein leading to a canal C' through which water is adapted to be conducted for irrigation and other purposes. The wall of the bank B preferably is concaved as at $C^2$ adjacent to the opening C and curved bars D are fastened to the horizontal portion, spaced apart and secured at their ends to the edges of the opening. Swinging gates E have pivotal pins E' at the ends thereof which are mounted in the plates $E^2$ secured to the wall of the bank, said gates being preferably curved as shown. The curving of the gates serves two purposes, as by such a construction they will be forced up near the screen where they prevent fish from passing between said gates and the screen upon the wheel. Said gates being curved as shown will tend to hold any fine trash which might accumulate intermediate the screened circumference of the wheel and the gate when the same is held back by the current of water passing down the screen and, when sufficient pressure comes upon the gates incident to the trash packing in between the wheel and the gates, the latter will yield to allow the trash to pass out into the canal and be carried by the current down the latter. After the trash has passed out, the current of the down stream will throw the gates back to the positions in which they are adapted to prevent fish from passing into the canal.

A high-power screened wheel I is mounted in suitable bearings at one end of the canal and is provided with a series of wings made up of sections K, K which are hinged to the nonswinging wings $K^2$ at K', said wings being preferably curved slightly and adapted to fold or feather in order to offer little resistance to the water. A space J intervenes between the wall of the canal and the circumference of the wheel in order to allow any fine trash or foreign matter which might lodge against the screen to be carried by the current past the wheel. A suitable screen N is mounted about the wheel to the opening leading into the canal, serving to prevent fish from entering the canal. It will be noted that the bank of the stream adjacent to the opening into the canal in which the wheel is located is concaved and extends out into the stream, thus tending to throw laterally any obstructions which might come against the same.

A float, designated by letter O, made on the arc of a circle, is mounted in front of the opening leading into the canal and is guided by the standards Q in its vertical movements and has its lower edge projecting outward beyond its upper edge, serving as a means to prevent the under going current from drawing drift or trash under it, thereby prevents clogging of the wheel and water passageway, the float holding the passing matter at bay.

Gates W of a lock and dam are illustrated in Fig. 1 of the drawings and located at any suitable distance below the opening leading into the canal or ditch and which is adapted to be closed at such time as water may be low within the stream. This obstruction of the flow of water in the stream will allow the water to flow into the canal for the purpose of irrigating fields, etc. It will be understood that, at such time as the lock in the stream is closed, any drift coming against the float will be carried by eddy current past the opening leading into the canal and, when the lock is opened, pass down the stream. By the provision of a lock and dam in the canal, as shown in Fig. 1 of the drawings, means is afforded whereby, when the gates are closed, the power wheel will be at rest, not being operated automatically by the current of water and when not so operated it will prevent the inflow of water into the canal or ditch and prevent also fish from entering the canal. By reason of the curvature of the gates E, any trash which might come in contact therewith and being carried down by the current would be deflected away from the opening which leads into the canal.

The operation of my apparatus will be readily understood and is as follows:—As the water current flows down the stream and is deflected into the canal, the power wheel will be caused to rotate and the sections of the wings will feather, thus offering little frictional resistance to the water and increasing the power upon the active wings of the wheel. In the event of any small particles of floating or foreign matter passing the float and lodging upon the screen and collecting in sufficient quantity to cause the gates to swing outward, the trash will pass out into the stream or current of water. By this operation, it will be noted that the wheel will be kept clear of obstructions at all times, as the wheel will be kept continuously rotated by the current of water, said wings being opened by the inrushing current of water and, as they strike against the bars connecting the ends of the wheel, will by their rapid movement and the noise caused by their striking against said bars tend to scare the fish away. As the float is guided by the rods, it will rise upon the surface of the water and tend to prevent floating trash from entering the canal and the horizontally disposed curved bars D will tend to catch and ward off any driftwood which might be drawn underneath the float and prevent the same from becoming entangled with the wheel and at such time as the gates of the canal might be closed, the drift being carried down stream.

By the provision of an apparatus embodying the features of my invention, it will be noted that a simple and efficient device is afforded whereby driftwood, trash as well as fish will be prevented from passing into irrigating canals and which, if allowed to pass into the canals, would have a tendency to strew the fields with debris and allow fish to become stranded and decay, tending to cause unhealthy conditions as well as a loss of food supply. By the provision of the means shown and described, these objections are avoided and the apparatus will be operated automatically, tending at all times to prevent foreign matter from passing into the canals.

While I have shown my wheel and apparatus designed especially for the purpose set forth, still it will be understood that power may be transmitted from the wheel, if desired, for any mechanical purpose by suitable connections.

What I claim to be new is:—

1. An apparatus for preventing fish and drift from passing into irrigating canals, etc., comprising a rotatable screened power wheel adapted to be positioned near the entrance to the canal leading from a stream and positioned a slight distance from the wall of the canal, bars positioned across the entrance leading into the canal, and pivotally mounted yielding gates at the opening in the canal and adjacent to said wheel, as set forth.

2. An apparatus for preventing fish and drift from passing into irrigating canals, etc., comprising a rotatable screened power wheel adapted to be positioned near the entrance to the canal leading from a stream and positioned a slight distance from the wall of the canal, bars positioned across the entrance leading into the canal, pivotally mounted yielding gates at the opening in the canal and adjacent to said wheel, and a vertically movable float positioned adjacent to said bars, as set forth.

3. An apparatus for preventing fish and drift from passing into irrigating canals, etc., comprising a rotatable screened power wheel adapted to be positioned near the entrance to the canal leading from a stream and positioned a slight distance from the wall of the canal, bars positioned across the entrance leading into the canal, pivotally mounted yielding gates at the opening in the canal and adjacent to said wheel, vertically disposed bars positioned slight distances from the entrance to the canal, and a float movable upon said vertical bars, as set forth.

4. An apparatus for preventing fish and drift from passing into irrigating canals, etc., comprising a rotatable screened power wheel, said wheel having fixed nonswinging and swinging hinged wings with cross bars connecting the ends of the wheels, a screen about said bars, pivotally mounted wheel, gates adjacent to said wheel and tending to prevent fish from passing by the wheel and serving to deflect trash carried by the current in the stream from coming in contact with the wheel, as set forth.

In testimony whereof I hereunto affix my signature in presence of two witnesses.

ANDREW J. ALLISON.

Witnesses:
SHURIDON M. HURDY,
LEE R. SMITH.